No. 679,000. Patented July 23, 1901.
M. HOLAUBEK.
VEHICLE WHEEL HAVING RESILIENT TIRE.
(Application filed May 14, 1901.)
(No Model.)

WITNESSES: Wm. S. Bell. Robert J. Pollitt

INVENTOR, Marie Holaubek,
BY Gartner & Steward,
ATTORNEYS.

THE NORRIS PETERS CO., PHOTO-LITHO., WASHINGTON, D. C.

UNITED STATES PATENT OFFICE.

MARIE HOLAUBEK, OF VIENNA, AUSTRIA-HUNGARY.

VEHICLE-WHEEL HAVING RESILIENT TIRE.

SPECIFICATION forming part of Letters Patent No. 679,000, dated July 23, 1901.

Application filed May 14, 1901. Serial No. 60,130. (No model.)

*To all whom it may concern:*

Be it known that I, MARIE HOLAUBEK, of no occupation, a subject of the Emperor of Austria-Hungary, residing in IV, Wienstrasse, No. 21, Vienna, in the Empire of Austria-Hungary, have invented certain new and useful Improvements in Vehicle-Wheels with Resilient Tires; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

The present invention has reference to a vehicle-wheel with resilient tire for the purpose of neutralizing the shocks or concussions which a wheel is subjected to when running over uneven road-surfaces.

Hitherto in resilient wheels with spiral springs the pressure acted upon the latter unnaturally—viz., at right angles to their longitudinal axis.

In the wheel according to the present invention the pressure bears upon the springs naturally—*i. e.*, in the direction of their longitudinal axis.

In order to make the invention more readily understood, I have illustrated it on the accompanying sheet of drawings, in which—

Figure 1:
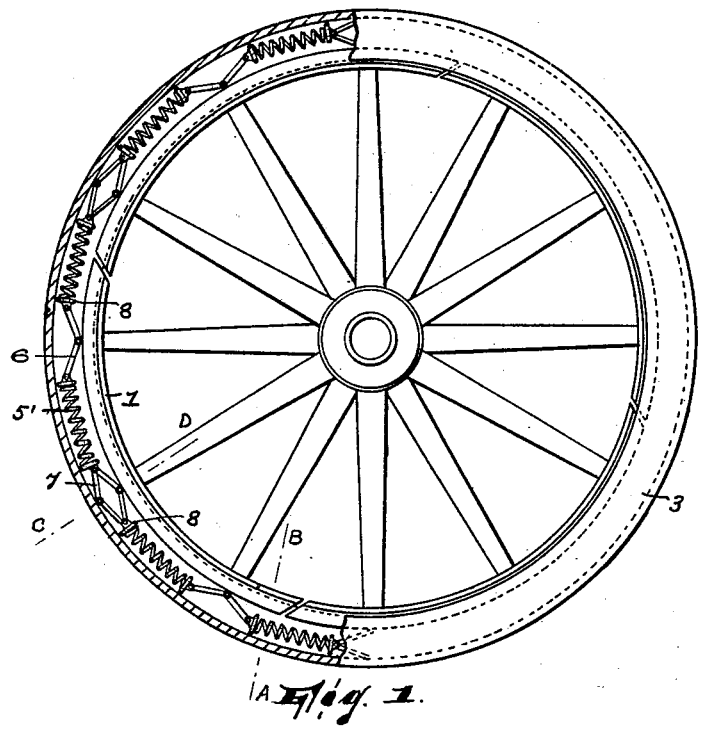
Figure 2:
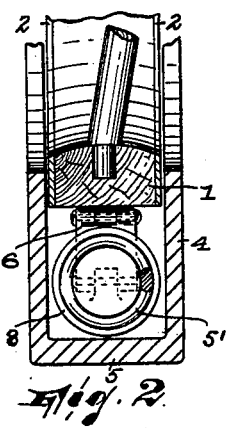
Figure 3:
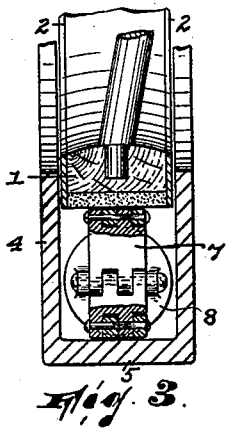

Figure 1 shows a side elevation of a wheel according to my invention, partly in section; and Figs. 2 and 3 are sections through Fig. 1 on lines A B and C D, respectively.

The felly 1 is made up of a number of sections or segments, which are not rigidly connected to one another, but are provided with side plates 2, overlapping each other. The tire 3 is U-shaped in section and is preferably made in one piece. The two sides of the U form the support for the segments of the felly with the side plates, while a suitably-stiffened cross-piece 5 of the U forms the rim of the wheel. A suitable number of helical springs 5' are provided in the space between the felly 1 and the tire 3, the same being separated from each other by suitably-constructed articulated levers, toggle-joints, or the like. These toggle-joints may be single or double joint levers 6 and 7, as shown. The single toggle-joint lever 6 is provided at either end with guide-disks 8, and the felly rests upon the joint and forms the point of application of pressure. The double toggle-joint lever 7 has the shape of a parallelogram, (rhomb,) and it is upon the obtuse angles of such parallelogram that the felly and the tire act, two points of application of the pressure being thus afforded. As in the case of the single toggle-joint levers, the guide-disks are arranged at the ends of said toggle-joint levers 7, bearing against the adjoining ends of the helical springs.

The action of the wheel is as follows: The jolts caused by unevenness of the ground result in the relative displacement of felly and tire, the latter being placed eccentrically of the tire. The felly then exerts a pressure upon the toggle-joint levers, which are then extended, compressing by means of the guide-disks the helical springs in the direction of their longitudinal axes. On the pressure being removed the helical springs produce the normal condition again. In this manner concussions are received and neutralized by the helical springs, and the latter are used in the manner adapted to their shape, the conditions under which they are acted upon being most favorable and the resiliency obtained being extensive, continuous, and endless.

Having thus fully described my invention, what I claim as new, and desire to secure by Letters Patent, is—

1. In a vehicle-wheel, the combination of a U-shaped tire, a plurality of helical springs resting in the hollow of said tire, articulated or toggle-jointed levers interposed between the said helical springs and connected thereto at their ends, guide-disks articulated to the ends of the said levers and bearing against the adjoining helical springs, and a felly made up of a number of segments guided in the said U-shaped tire, substantially as described.

2. In a vehicle-wheel, the combination of a U-shaped tire, a plurality of helical springs, resting in the hollow of the said tire, articulated or toggle-jointed levers interposed between the said helical springs, guide-disks articulated to either end of the said levers and bearing against the adjoining helical springs, a felly made up of a number of segments guided in the said U-shaped tire, overlapping side plates provided upon either side of the felly-segments, and spokes corresponding to the number of the said interposed articulated or toggle-jointed levers, substantially as described.

In testimony that I claim the foregoing I have hereunto set my hand this 27th day of April, 1901.

MARIE HOLAUBEK.

Witnesses:
 FRANZ REITER,
 ALVESTO S. HOGUE.